(No Model.)
F. KEIFEL.
ADJUSTABLE BLOWER FOR STOVES.
No. 424,559. Patented Apr. 1, 1890.
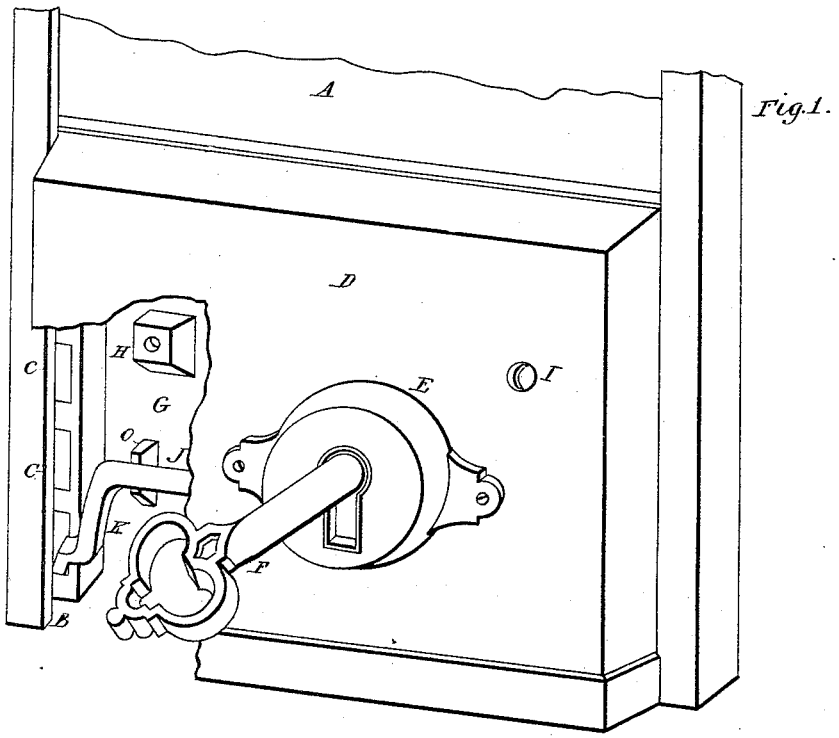
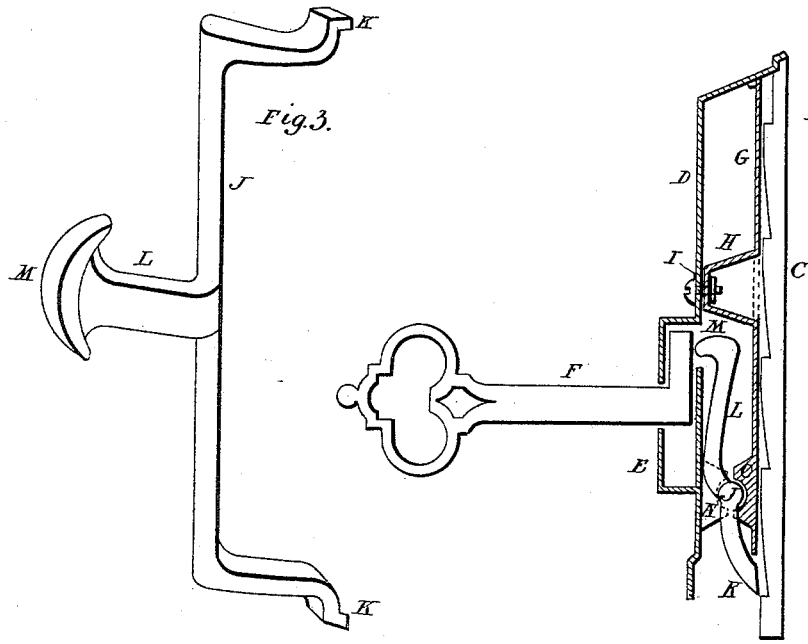
Witnesses:
Inventor:
Friedrich Keifel,
by Beattie & Beattie
his Attys.

UNITED STATES PATENT OFFICE.

FRIEDRICH KEIFEL, OF LOUISVILLE, KENTUCKY.

ADJUSTABLE BLOWER FOR STOVES.

SPECIFICATION forming part of Letters Patent No. 424,559, dated April 1, 1890.

Application filed November 26, 1889. Serial No. 331,664. (No model.)

*To all whom it may concern:*

Be it known that I, FRIEDRICH KEIFEL, a citizen of the United States, residing at Louisville, in the county of Jefferson and State of Kentucky, have invented certain new and useful Improvements in Adjustable Blowers for Stoves; and I do hereby declare the following to be a full, clear, and exact description of the invention, such as will enable others skilled in the art to which it appertains to make and use the same.

My invention consists, generally, of an adjustable blower to be attached to a stove, and which may be raised to any desired height and automatically held in place, thus regulating the draft and supplying the place of the ordinary stove-door.

In the accompanying drawings, Figure 1 is a perspective view of a portion of a stove and the blower, a part of the front of which is broken away to show the construction of the interior. Fig. 2 is a sectional plan view of the blower and a small part of the stove. Fig. 3 is a perspective view of the journal, lever, and dogs, which hold the blower in position.

In the different figures like letters indicate like parts.

A is the stove, the opening of which is closed by the blower in Fig. 1. On each side of the stove-opening is the recess B, having the notches C.

D is the front of the blower, the sides of which form flanges, which move in the recesses B, and are thereby guided. Near the center of the blower-front is the key-plate E, into which the key F is placed when the blower is to be moved.

G is the back of the blower, which has the recesses H, into which fit the nuts of the bolts, that also pass through the holes I and bind the front and back of the blower together.

J is a journal, on each end of which is formed the dog K, and in the middle is attached the lever L, the upper part of which M is semicircular in shape and passes through an opening in the front of the blower and into the key-plate E when the key is withdrawn. The journal J is supported near each dog by the bearings N, formed upon the front, and O, formed upon the back of the blower. The lower corners of the back and front of the blower are partially cut away to allow the ends of the dogs to pass from within into and move freely in the recesses B. The upper part M of the lever forms a weight, which, when the key is withdrawn from the key-plate, tends to fall forward and moves the dogs K toward the notches C, so that they become engaged therein. To raise the blower, the key is passed into the key-plate and lifted upward, the dogs readily moving up the inclined part of the notches. When the desired position is reached, the key may be withdrawn and the dogs hold the blower in place by coming in contact with the notches. To lower the blower, the key is passed into the key-plate and turned, so that its bit comes in contact with the upper part M of the lever, forcing it backward and moving the journal and withdrawing the dogs from the notches, as shown in Fig. 2. When the blower is lowered to the proper distance, the key is turned and the dogs allowed to come in contact with the notches, and thus held in position.

When not in use, the key is withdrawn from the key-plate, so as not to become heated.

This principle can be applied to windows and shutters, especially of the different kinds of cars. The key and key-plate may be dispensed with, and the journal moved and the dogs disengaged from the notches formed in the grooves of the window-case by pressing a finger upon the end of the lever. The journal is supported by bearings screwed to the window or shutter frame.

Having fully described my invention, what I claim as new, and desire to secure by Letters Patent, is—

1. In an adjustable blower for stoves, the combination, with the stove-front provided with side racks, of a blower supported upon a journal having bent ends adapted to engage such side racks and rotating in bearings formed upon the walls of the blower, substantially as and for the purposes specified.

2. In an adjustable blower for stoves, the combination, with the side racks, of a blower having its front wall provided with a key-plate, and a lever for supporting such blower, provided with the bent ends engaging such side racks, and a central arm projecting into said key-plate, substantially as and for the purposes specified.

3. In an adjustable blower for stoves, the combination, with the side racks and the blower-supporting journal having its ends bent to engage such racks and provided with a central weighted arm, of a front plate having the escutcheon or key plate into which such arm projects, substantially as and for the purposes specified.

4. In an adjustable blower for stoves, the combination, with a stove-front provided with side racks, a double-walled blower composed of front and rear plates secured together, as described, and provided upon its front plate with an escutcheon or key plate, of a journal for supporting said blower, rotating in bearings formed on the walls thereof and having its ends bent to engage the side racks, and provided at its center with a weighted arm projecting into the key-plate, and a key for exerting pressure upon said weighted arm, whereby the journal is caused to rotate and its ends to engage with or be released from the side racks, substantially as specified.

In testimony whereof I affix my signature in presence of two witnesses.

FRIEDRICH KEIFEL.

Witnesses:
PEYTON S. KINKEAD,
MARIE E. HANRAHAN.